UNITED STATES PATENT OFFICE.

CHARLES E. AVERY, OF BOSTON, MASSACHUSETTS, ASSIGNOR TO THE AVERY LACTATE COMPANY, OF PORTSMOUTH, NEW HAMPSHIRE.

MANUFACTURE OF LACTATES.

SPECIFICATION forming part of Letters Patent No. 330,815, dated November 17, 1885.

Application filed November 2, 1883. Serial No. 110,701. (No specimens.)

*To all whom it may concern:*

Be it known that I, CHARLES E. AVERY, of Boston, in the county of Suffolk and State of Massachusetts, have invented certain Improvements in the Manufacture of Lactates, of which the following is a specification.

This invention has for its object to produce a lactic ferment and crude lactates practically pure from other ferments; and it consists in cultivating lactic ferments in mediums especially favorable to the growth of the lactic ferment, but less favorable to the growth of the other ferments—such as the butyric, alcoholic, putrefactive, &c. If in mixed ferments consisting of living beings rapidly multiplying a medium be found specially favorable to the multiplication of one of these ferments and less favorable to the increase of the others, a practically pure ferment can be isolated, if the medium be maintained favorable. Taking, for example, two ferments, which we will designate as A and B, let ferment A multiply as two to one and B as nine to one. Then we have A: second generation = 2; third = 4; fourth = 8; fifth = 16; and B: second generation = 9; third = 81; fourth = 729; fifth = 6561; so that if A and B were at first in equal quantities at the fifth generation the mixed ferment will contain only about one-fourth of one per cent. of A, which I consider a practically pure ferment. This being an unquestioned fact, it becomes necessary to find a medium especially favorable to the lactic ferment and unfavorable to the butyric, alcoholic, putrefactive, &c. Such a medium may be produced by changing meal to glucose, leaving in the residual albumenoids and minerals as food for the ferment, and adding suitable neutralizers—such as carbonate of lime—for the acid produced.

I have found that when the above-described medium is used putrefaction after several cultures does not set in for weeks, and butyric change for several days, after the lactic has terminated.

A medium favorable in the highest degree to lactic fermentation I find to contain one thousand parts of starch-sugar, dextrine, or glucose, or milk-sugar to six thousand parts of water, about five hundred parts of carbonate of lime, and about one hundred parts of vegetable nitrogenous matter kept at a heat of from 95° to 113° Fahrenheit, the higher heat being preferable. This solution, if freshly impregnated, tends to free itself of molds, the viscous mannitic and butyric ferments, &c., and becomes a pure lactic ferment. The impregnation of one solution from the preceding one should take place at the full height of fermentation, as evinced by the evolution of the carbonic-acid gas at its first maximum. The second maximum, which is not so violent, takes place when the after butyric fermentation is at its height, and the material is then unfit for use. Since the butyric ferment lives on lactates already formed, and, moreover, appears to be injured by oxygen, being a vibrio, not a bacterium, the use of freshly prepared and impregnated culture solutions is found advisable. I have used a bath from which the glucose was withdrawn and milk-sugar put in its place. The alcoholic ferment was reduced and afterward exterminated in this bath, owing to the fact that the alcoholic ferment, unless present in large quantity, multiplies with difficulty in milk-sugar. Since moist flour or meal, as in bread, putrefies but slowly, it is a good material to breed out all putrefactive vibrios, if able actively to support the lactic ferment, and since sugar prevents putrefaction the change of starch to glucose does not aid putrefaction.

My crude lactates are practically inodorous and wholly free from the slightest taint or evil smell, and if acidulated and distilled at the ordinary boiling-point will yield little or no volatile acids or alcohol, and the same is therefore more readily purified with practically no waste, whereas if an ordinary or impure crude lactate is acidulated and distilled large quantities of alcohol or acids of the fatty series—such as acetic, propionic, or butyric—are set free and escape, which greatly lessens the yield of lactic acid, and the subsequent purification is rendered difficult and expensive.

A practically pure lactic ferment isolated from other ferments, substantially as hereinbefore set forth, serves as a reagent by means of which practically pure lactic acid and crude inodorous lactates may be manufactured from sugars of vegetable origin—such as starch-sugar or glucose, &c., and from milk-sugar, &c.

I claim—

1. The process of purifying and preserving a lactic ferment by adding said ferment to a medium specially favorable to its growth and less favorable to the growth of other ferments, substantially as set forth.

2. In the manufacture of crude lactates and lactic acid, the method of preparing a culture-bath consisting in adding about one thousand parts of starch-sugar, dextrine, glucose, or milk-sugar to six thousand parts of water, then adding about five hundred parts of carbonate of lime, and finally adding about one hundred parts of vegetable nitrogenous matter, the mixture being kept at a heat of from 95° to 113° Fahrenheit, substantially as set forth.

3. In the manufacture of crude lactates and lactic acid, the preparation of a practically pure reagent for producing lactic acid, consisting in the successive impregnation of a series of culture-baths with lactic ferment, the impregnation of each solution from the preceding one being effected at the point of full height of fermentation, as evidenced by the evolution of the carbonic-acid gas at its first maximum, substantially as set forth.

In testimony whereof I have signed my name to this specification, in the presence of two subscribing witnesses, this 26th day of October, 1883.

CHARLES E. AVERY.

Witnesses:
C. F. BROWN,
A. L. WHITE.